(12) United States Patent
Ramachandran et al.

(10) Patent No.: US 11,178,282 B1
(45) Date of Patent: Nov. 16, 2021

(54) METHOD AND APPARATUS FOR PROVIDING ACTIVE CALL GUIDANCE TO AN AGENT IN A CALL CENTER ENVIRONMENT

(71) Applicant: UNIPHORE TECHNOLOGIES INC., Palo Alto, CA (US)

(72) Inventors: Samith Ramachandran, Santa Clara, CA (US); Umesh Sachdev, Fremont, CA (US)

(73) Assignee: UNIPHORE TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 17/139,873

(22) Filed: Dec. 31, 2020

(51) Int. Cl.
 *H04M 3/51* (2006.01)
(52) U.S. Cl.
 CPC ....... *H04M 3/5175* (2013.01); *H04M 3/5133* (2013.01)
(58) Field of Classification Search
 CPC .......................... H04M 3/5175; H04M 3/5133
 USPC .............. 379/266.1, 265.11, 265.05, 266.01, 379/265.01
 See application file for complete search history.

(56) References Cited

U.S. PATENT DOCUMENTS

| | | | | |
|---|---|---|---|---|
| 10,847,140 | B1* | 11/2020 | Conner | G06F 3/04817 |
| 2015/0350430 | A1* | 12/2015 | Nowak | H04M 3/5175 |
| | | | | 379/265.09 |
| 2016/0191709 | A1* | 6/2016 | Pullamplavil | G10L 25/48 |
| | | | | 379/266.07 |

\* cited by examiner

*Primary Examiner* — Thjuan K Addy
(74) *Attorney, Agent, or Firm* — Praveer K Gupta

(57) ABSTRACT

A method and apparatus for guiding an agent during an active call between the customer and an agent is provided. The method comprises extracting, at a call analytics server (CAS), from a transcribed text of an audio of a call between a customer and an agent, a call context. Based on at least one of the call context, a call metadata, or a customer historical data, occurrence of a qualifying event is determined. Upon occurrence of the qualifying event, an action from multiple actions is identified based on at least one of the call context, the call metadata, or the customer historical data. The identified action is sent as guidance from the CAS to a graphical user interface (GUI) accessible by the agent, while the call is active.

12 Claims, 3 Drawing Sheets

METHOD AND APPARATUS FOR PROVIDING ACTIVE CALL GUIDANCE TO AN AGENT IN A CALL CENTER ENVIRONMENT

FIELD

The present invention relates generally to improving call center computing and management systems, and particularly to providing active call guidance to an agent in a call center environment.

BACKGROUND

Several businesses need to provide support to its customers, which is provided by a customer care call center. Customers place a call to the call center, where customer service agents address and resolve customer issues, to satisfy the customer's queries, requests, issues and the like. The agent uses a computerized call management system used for managing and processing calls between the agent and the customer. The agent attempts to understand the customer's issues, provide appropriate resolution, and achieve customer satisfaction.

However, operating conventional call center computing and management systems place a significant workload on the agent during a call, for example, listening to the customer carefully, while ensuring compliance with processes for information and data capture, and identifying a solution. The agent may need time for performing these activities, for which, the customer may need to be placed on a hold, and the agent may sometimes err in comprehending the issue or providing an optimal solution.

Accordingly, there exists a need for improved call center computing and management systems, which can provide active call guidance to an agent.

SUMMARY

The present invention provides a method and an apparatus for providing active call guidance to an agent in a call center environment, substantially as shown in and/or described in connection with at least one of the figures, as set forth more completely in the claims. These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
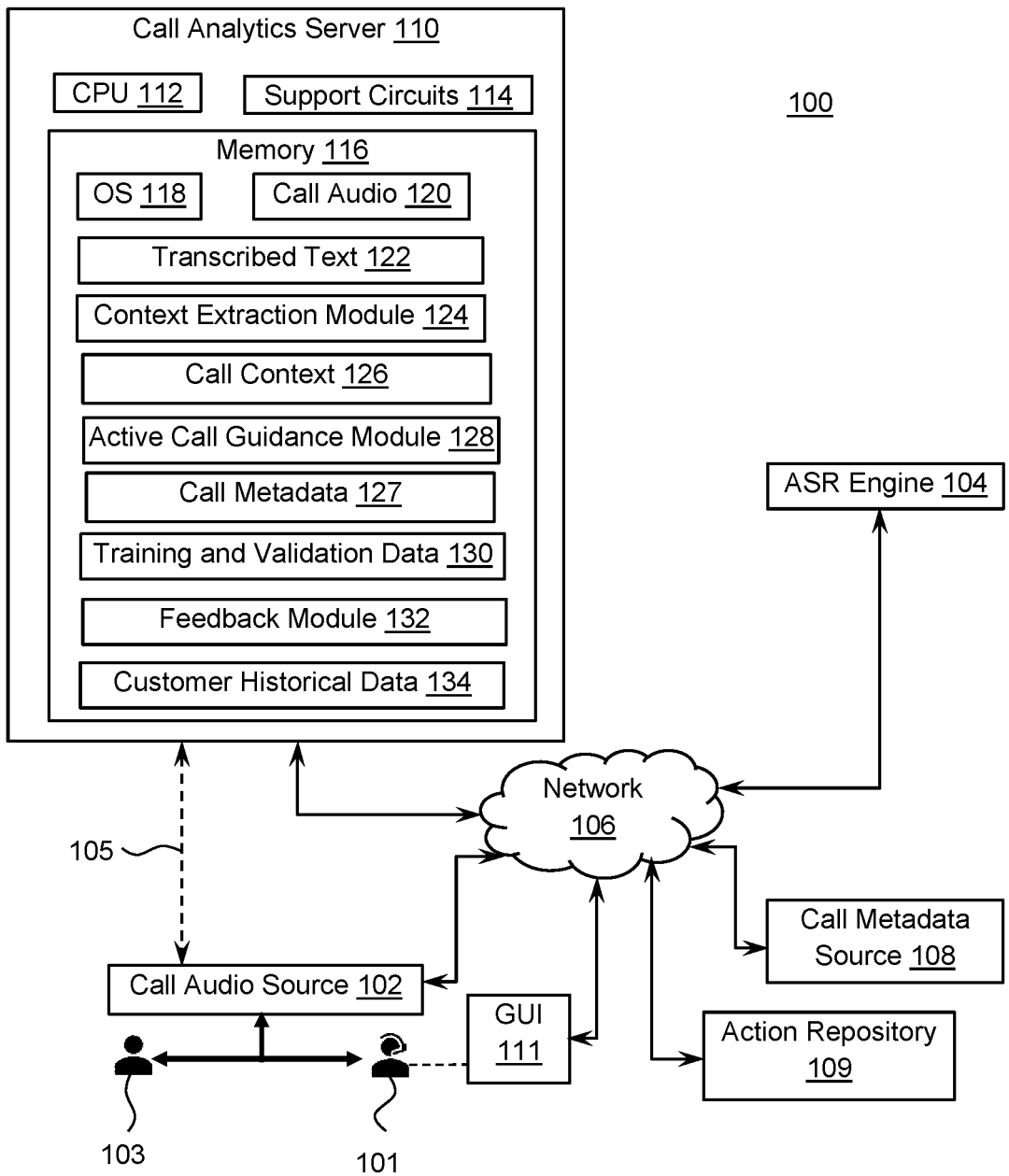
FIG. 1 is a schematic diagram depicting an apparatus for providing active call guidance to an agent in a call center environment, in accordance with an embodiment of the present invention.

Embodiments of the present invention relate to a method and an apparatus for providing active call guidance to an agent in a call center environment, for example, during a voice call between an agent and a customer of a business. Active call guidance is provided when the call meets a predefined criterion, and is based on one or more of call context extracted from the transcribed text of the conversation, call metadata and historical data of the customer. Context is extracted from transcribed audio of the call or a portion of the call, such as a turn of a speaker (agent or customer). As the call progresses with a turn-by-turn speech of the customer and the agent, the speech is transcribed, and a portion of the transcribed speech, or the entirety of the transcribed speech is used to extract context, call metadata is obtained from systems of the business, and historical data of the customer is obtained from stored call analytics corresponding to the customer.

Call context includes call intent or reason, call topics, customer sentiment, and call entities or portions of the transcribed text that help define what the call is about. Call entities include descriptors, such as names or identifiers, for example, the name of a patient, a doctor, a provider, an insurance company, numbers, for example, amount of money (e.g., premium, deductible, co-pay), dates, for example, date of birth, date of visit, account or customer number, among others. Call metadata includes information related to the call, from which information such as customer profile, history of calls, customer longevity, loyalty tier, customer life-time value (CLTV), complaint history and the like, are extracted. Call metadata is obtained, for example, from a customer relationship management (CRM) system for the business regarding which the customer calls the agent. Customer historical data includes satisfaction history, sentiment history, and other call analytics history derived from previous call of the customer.

Based on one or more of the call context, the call metadata or the customer historical data, it is determined if a qualifying event for providing an active call guidance has occurred. For example, if the customer has been with the business for a specified period of time (e.g., 5 years), the customer is considered a high loyalty tier (e.g., a high tier), CLTV is high (e.g., $1,000), the customer has had multiple complaints in the past (e.g., 4 complaints), was not satisfied in the past 3 call(s), bears a negative sentiment in the current call, or one or more of the above or similar factors, then it is determined that the call qualifies as an event for which active call guidance must be provided. Next, one or more of the call context, call metadata or customer historical data are matched with predefined actions, such as offers, promotions, upsell or cross-sell opportunities, among others. For example, one or more of the call context, the call metadata or the customer historical data are matched to one or more actions by an algorithm or a trained artificial intelligence (AI) and/or machine learning (ML) model (AI/ML model), which is trained to receive such inputs, match the inputs to one or more actions, and outputs action(s) that are a high match with the inputs. The output generated by the AI/ML model may be interpreted, for example, by a user or another program.

The highly matched action (or offer) identified in this manner are presented to the agent as a recommended action or guidance while the call is active, for the agent to offer the recommended action to the customer during the call. The agent may provide feedback regarding relevancy of the recommended action(s), including a score, and it may be determined whether the agent offered the recommended action to the customer. The agent feedback and whether the recommended action was offered to the customer may be used to improve the matching and recommendation of the action. Customer feedback to the action(s) presented may also be evaluated, for example, customer sentiment in response to the action, whether the customer accepts an offer included in the action(s), and the like. The agent and/or customer feedback is used to improve the recommendation of the same or similar action next time for the same customer, or for other customers.

FIG. 1 is a schematic diagram of an apparatus 100 for predicting customer behavior in relation to a call between a customer and an agent, in accordance with an embodiment of the present invention. The apparatus 100 comprises a call audio source 102, an automatic speech recognition (ASR) engine 104, a call metadata source (CMS) 108, an action repository 109, and a call analytics server (CAS) 110, each communicably coupled via a network 106. In some embodiments, the call audio source 102 is communicably coupled to the CAS 110 directly via a link 105, separate from the network 106, and may or may not be communicably coupled to the network 106.

The call audio source 102 provides audio of a call to the CAS 110. In some embodiments, the call audio source 102 is a call center providing live or recorded audio of an ongoing call between a call center agent 101 and a customer 103 of a business which the call center agent 101 serves. In some embodiments, the call center agent 101 interacts with a graphical user interface (GUI) 111 for viewing and providing inputs with respect to a recommended action/call guidance. In some embodiments, the GUI 111 is a part of a computing device, and the GUI is capable of displaying an output to the agent 101, and receiving one or more inputs from the agent 101. In some embodiments, the GUI 111 is a part of the call audio source 102, and in some embodiments, the GUI 111 is communicably coupled to the CAS 110 via the network 106.

The ASR engine 104 is any of the several commercially available or otherwise well-known ASR engines, as generally known in the art, providing ASR as a service from a cloud-based server, a proprietary ASR engine, or an ASR engine which can be developed using known techniques. ASR engines are capable of transcribing speech data to corresponding text data using automatic speech recognition (ASR) techniques as generally known in the art. In some embodiments, the ASR engine 104 is implemented on the CAS 110 or is co-located with the CAS 110.

The network 106 is a communication network, such as any of the several communication networks known in the art, and for example a packet data switching network such as the Internet, a proprietary network, a wireless GSM network, among others. The network 106 is capable of communicating data to and from the call audio source 102 (if connected), the ASR engine 104, the CMS 108, the CAS 110 and the GUI 111.

The CMS 108 includes a customer relationship management (CRM) system of the business, regarding which the customer makes the call to the business' call center agent. The CMS 108 includes information about one or more of the customer, the agent or the business, among other information relating to the call. The information obtained from the CMS 108 is referred to as call metadata.

The repository 109 includes several actions that may be recommended to a customer of the business, and in some embodiments, the repository 109 is implemented by the business, or by a third party. In some embodiments, each of the actions include associated metadata which enables comparison of such actions with the call context, the call metadata and/or other information including customer historical data. In some embodiments, either or both of the CMS 108 and the repository 109 are co-located with the CAS 110.

The CAS 110 includes a CPU 112 communicatively coupled to support circuits 114 and a memory 116. The CPU 112 may be any commercially available processor, microprocessor, microcontroller, and the like. The support circuits 114 comprise well-known circuits that provide functionality to the CPU 112, such as, a user interface, clock circuits, network communications, cache, power supplies, I/O circuits, and the like. The memory 116 is any form of digital storage used for storing data and executable software. Such memory includes, but is not limited to, random access memory, read only memory, disk storage, optical storage, and the like. The memory 116 includes computer readable instructions corresponding to an operating system (OS) 118, a call audio 120, for example, audio of a call between a customer and an agent received from the call audio source 102, transcribed text 122, for example, transcribed from the call audio 120, a content extraction module (CEM) 124, call context 126, for example, as obtained from the CEM 124, call metadata 127, for example, as obtained from the CMS 108, an active call guidance module (ACGM) 128, training and validation data 130, a feedback module 132, and customer historical data 134.

The transcribed text 122 is generated by the ASR engine 104 from the call audio 120. In some embodiments, the call audio 120 is transcribed in real-time, that is, as the conversation is taking place between the customer 103 and the agent 101. In some embodiments, the call audio 120 is transcribed turn-by-turn, according to the flow of the conversation between the agent 101 and the customer 103.

The CEM 124 extracts call context 126 from the transcribed text 122. The call context includes one or more of call intent, customer sentiment, or call entities. Call intent includes identifying a reason for the call, for example, booking a flight, and is based on identifying phrases and/or verbs associated with nouns, for example, booking a flight. Customer sentiment can be positive, negative, neutral and variations thereof, and can be identified by analyzing the transcribed text using one or more known sentiment analysis engines known in the art. Call entities are specifics or identifiers that help define what the call (e.g., the call 102) is about, for example, reservation number, passenger names, flight origin, flight destination, flight date, ticket cost, among several other such similar identifiers. In some embodiments, the CEM 124 is an artificial intelligence and/or machine learning (AI/ML) model, and in some embodiments the CEM 124 is an algorithmic module. The CEM 124 extracts each of the call intent, customer sentiment and call entities using Natural Language Processing (NLP) techniques on transcribed text of the call, for example, as known in the art. Together, the call intent, customer sentiment, and the call entities provide a context to the call, as to the reason for the call, the customer's sentiment, and the pertinent identifiers defining the call. The call context 126 is extracted from the transcribed text live, in real-time, while the call between the customer 103 and the agent 101 is active.

The ACGM 128 is an AI/ML module or an algorithmic module, which matches one or more of call context, call metadata or customer historical data with various actions in a repository, for example, the repository 109, to identify at least one recommended action. The ACGM 128 receives call metadata from the CMS 108, for example, in response to a request sent from the ACGM 128 to the CMS 108, or automatically. Further, the ACGM 128 accesses the customer historical data 134, which is generated by the feedback module 132.

If any of the call context 126, call metadata 127 or customer historical data 134 satisfies a predefined criterion, the ACGM 128 identifies at least one action for the agent 101 to present to the customer 103. The call context that the customer is booking a flight, the call metadata that the customer is a premier level customer or has a high CLTV, or the customer historical data that the customer has had a negative sentiment on the past two calls, each could be a predefined criterion for identifying an action for the agent to present to the customer. In some embodiments, the predefined criterion includes one or more such criteria from the call context, the call metadata or the customer historical data.

Upon the predefined criterion being satisfied, the ACGM 128 identifies at least one action from a repository of actions, such as the repository 109, such as an offer that the agent 101 presents to the customer 103. The ACGM 128 matches one or more parameters from one or more of the call context, the call metadata or the customer historical data, to an action from the repository 109, to identify the action as guidance or recommendation to the agent 101 to present to the customer 103. The matching may be performed by the ACGM 128 by querying the repository 109 based on the parameters, or by a matching algorithm configured to match one or more such parameters with action(s), or by one or more trained AI/ML models for matching such parameters with suitable action (s). In some embodiments, the ACGM 128 is configured to identify a single action, and in some embodiments, the ACGM 128 is configured to identify more than one action as guidance for the agent 101.

In embodiments using AI/ML models, the ACGM 128 is first trained using training and validation data 130 using training and validation techniques to train AI/ML models as well known in the art. The training and validation data 130 includes known best action(s) which match with parameters of the call context, call metadata and/or customer historical data, corresponding to one or more call scenarios or actual calls.

Once an action (or multiple actions) is identified by the ACGM 128, the ACGM 128 presents the action (an offer for the customer 103) to the agent 101 as guidance, for example, via the GUI 111. The agent 101 acts on the action guidance provided by the ACGM 128, and presents the offer to the customer 103. In some cases, the agent may not act according to the guidance of the ACGM 128, and does not present the offer to the customer 103.

In some embodiments, the feedback module 132 tracks whether the agent 101 presented the offer to the customer 103, for example, using transcribed text of the speech of the agent after the action guidance is presented to the agent, or by direct input by the agent indicating whether the offer was presented or not. In some embodiments, the feedback module 132 also tracks whether the customer is satisfied with the offer presented, for example, using transcribed text of the speech of the customer, or by direct input by the agent indicating whether the customer was satisfied or not. In some embodiments, the feedback module 132 scores actions from the repository 109 by determining which action resulted in customer satisfaction. For example, the feedback module 132 presents options to the agent (or to the customer, via the agent) to select satisfaction ratings for each guided action. Alternatively, or in addition, the feedback module 132 uses analysis of the transcribed text to determine whether the guided action resulted in customer satisfaction. All such information forms part of customer historical data 134, according to which, each action in the repository 109 is scored to identify action(s) best suited for presenting to the customer 103. In some embodiments, the feedback module 132 analyzes the feedback across different calls and different customers.

In some embodiments, the actions that receive negative satisfaction feedback from the customer 103 are excluded by the ACGM 128 from being presented to the customer 103 again, and the customer 103 is presented new or unseen actions or offers. In some embodiments, an action may be excluded by the ACGM 128 based on negative feedback of customers other than the customer 103. In some embodiments, the actions that received positive satisfaction feedback from the customer 103 earlier, are presented by the ACGM 128 to the customer 103 again. In some embodiments, an action may be included based on positive feedback of customers other than the customer 103. In some embodiments, negative and positive actions are clustered by the ACGM 128 according to demographics or patterns obtained from parameters from call context and/or customer historical data of several calls, with the same and/or other customers, and/or agents.

Figure 2:
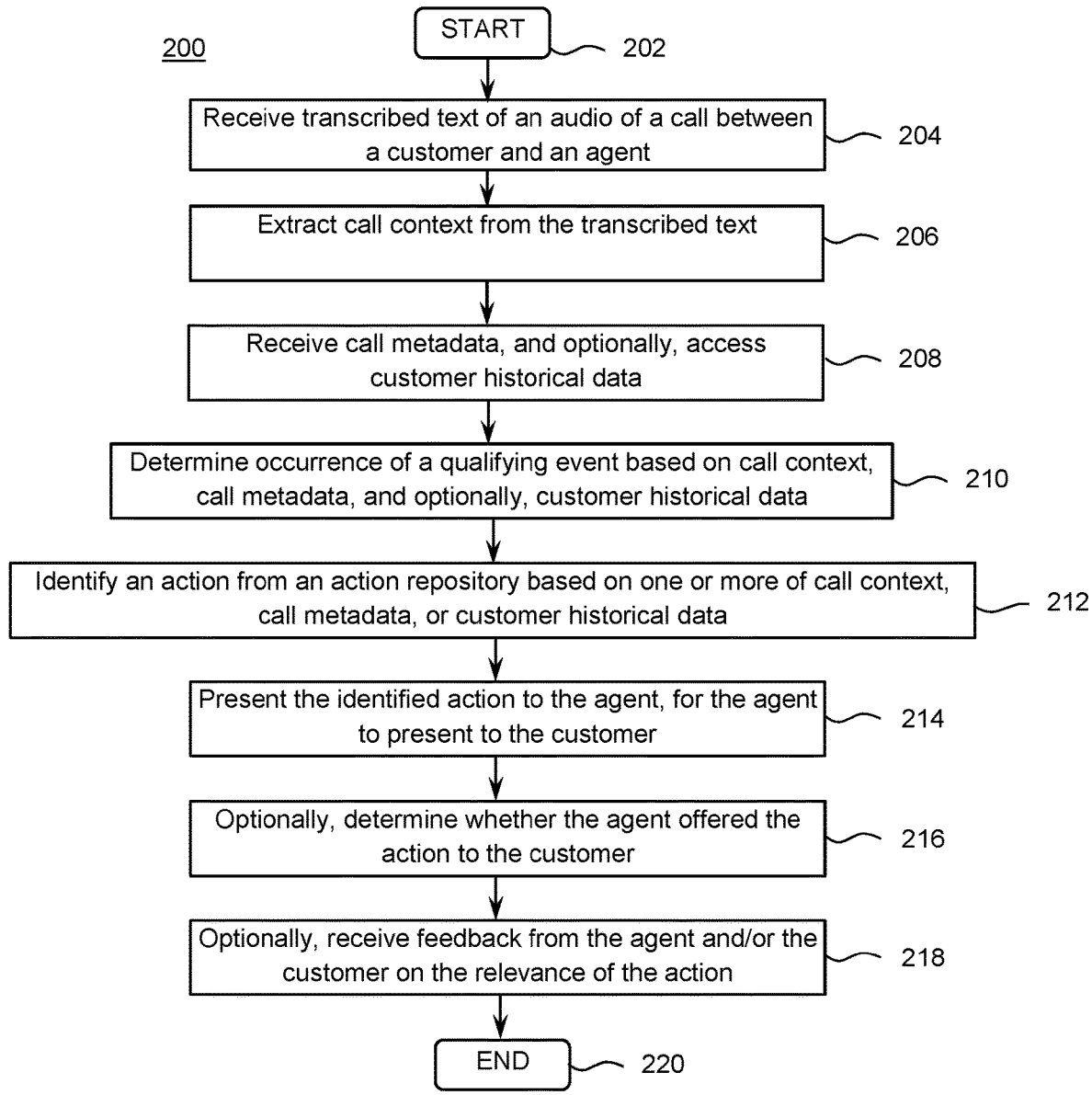
FIG. 2 is a flow diagram of a method for providing active call guidance to an agent in a call center environment, for example, as performed by the apparatus of FIG. 1, in accordance with an embodiment of the present invention.

FIG. 2 is a flow diagram of a method 200 for providing active call guidance to an agent in a call center environment, for example, as performed by the apparatus 100 of FIG. 1, in accordance with an embodiment of the present invention. In some embodiments, the method 200 is performed by various components of the CAS 110. The method 200 starts at step 202, and proceeds to step 204, at which, the method 200 receives transcribed text of an audio of a call between a customer of a business calling a call center of the business, and an agent of the call center. For example, the CAS 110 receives the transcribed text 122 from the ASR engine 104, corresponding to the conversation between the customer 103 and the agent 101. In some embodiments, the call audio 120 of the conversation is first received at the CAS 110, sent to the ASR engine 104, which transcribes the call audio 120 to generate the transcribed text 122, and sends the transcribed text 122 to the CAS 110. In some embodiments, the call audio is directly sent from the call audio source 102 (e.g., call center) to the ASR engine 104, which transcribes the call audio to the transcribed text 122. In some embodiments, the ASR engine 104 is implemented on the CAS 110 or is located locally to the CSA 110. The conversation may be transcribed according to the turn of each speaker, that is as each speaker speaks and completes their speech, or in real time, that is, as soon as possible within the constraints of communication and processing.

The method 200 proceeds to step 206, at which the method 200 extracts call context from the transcribed text 122. For example, the CEM 124 extracts the context from the transcribed text 122 by extracting an intent of the call or call intent, a sentiment of the customer or customer sentiment, and an entity pertinent to the call or call entity, which together form the extracted context. The CEM 124 is an NLP tool as known in the art, configured to process the transcribed text 122 to extract the context. The CEM 124 is a close-ended algorithm, an AI/ML module, or a combination thereof, which using known techniques, is configured to extract call intent, customer sentiment and call entity(ies) from the transcribed text 122 in real-time, while the call between the customer 103 and the agent 101 is active. In some embodiments, the CEM 124 extracts the context for each turn of a speaker. That is, the CEM 124 extracts context from the transcribed text corresponding to a turn of customer speech, and then extracts context from the transcribed text corresponding to the next turn of agent speech, then of the customer speech, and so on. In some embodiments, the CEM 124 extracts context of only the customer's speech.

The method 200 proceeds to step 208, at which the method 200 receives call metadata, and optionally, accesses customer historical data. For example, the ACGM 128 receives call metadata from the CMS 108, and accesses customer historical data 134, if available. The customer historical data 134 includes data from customer's previous calls, for example, customer sentiment, customer satisfaction, call intent, among other extracts using speech-based analytics. The customer historical data 134 also includes data about customer's interaction with one or more actions, that is, customer sentiment and customer satisfaction when presented a particular action (offer).

The method 200 proceeds to step 210, at which the method 200 determines occurrence of a qualifying event based on call context, call metadata, and optionally, customer historical data. For example, the ACGM 128 evaluates one or more of the call context, the call metadata, or the customer historical data to assess if a qualifying event for recommending an action has occurred. Examples of qualifying events include booking a flight, which is extracted as a call intent and forms a part of the call context. Actions (offers) such as an upgraded class of travel, a hotel or a rental car booking associated with the destination of the flight, a taxi service at the origin or the destination of the flight, among several others may lend themselves advantageously to such a qualifying event, and such actions may be performed upon occurrence of the qualifying events. While identification of actions which lend themselves to an event is discussed further in step 212, some non-limiting examples of qualifying events and associated actions that lend themselves to such events are provided.

An example of a qualifying event based on customer sentiment includes a negative customer sentiment, where the customer may have used the words "frustrated" or "unhappy" or similar negative words, which even may lend itself to actions (offers) such as a complimentary dinner, discount on associated product or service, among others. An example of a qualifying event based on call entity includes a flight number, which may lend itself to action to offer an upgraded travel class for a lower than usual amount, for flights that are usually unoccupied in higher classes of travel. An example of a qualifying event based on call metadata includes identifying the customer as a highly value customer (e.g., a high usage or high CLTV), which may lend itself to action to offer the customer complimentary lounge access. An example of a qualifying event based on customer historical data includes that the customer was not satisfied in the past three calls, which may lend itself to action to offer the customer a complimentary upgrade of travel class. Another example of customer historical data includes that the customer was not happy when offered complimentary upgrade of travel class in the past call, which may lend itself to action to offer the customer a complimentary hotel stay at the destination of the flight.

The examples above are intended to illustrate, and not limit either the definition of the qualifying events or the action(s) that may lend themselves to such events, and be performed when such events occur. In some embodiments, the qualifying event may be a combination of two or more such parameters (call context, call metadata, or customer historical data). For example, if the call intent is booking a flight, and the customer intent is negative, such an event may lend itself to actions such as offering the customer a complimentary upgrade of class of travel. As another example, the call metadata is that the customer is high value, and the customer historical data includes that the customer travels to destinations for cricket matches, such a qualifying event lends itself to action to offer high-value access tickets for a cricket match at the current destination at discounted prices.

Upon identification of a qualifying event at step 210, the method 200 proceeds to step 212, at which the method 200 identifies an action from an action repository based on one or more of call context, call metadata, or customer historical data. According to some embodiments, the ACGM 128 identifies at least one action from multiple actions, for example, the action repository 109, based on the call context, the call metadata, or the customer historical data. In some embodiments, the ACGM 128 queries the action repository 109 using words from the qualifying event, which in turn is comprised of one or more of the call context, the call metadata, or the customer historical data. In some embodiments, the ACGM 128 employs a matching algorithm, for example, as generally known in the art, configured to match words from the qualifying event to the actions in the action repository, and identify an action(s) with the highest match to the qualifying event. In some embodiments, the ACGM 128 employs an AI/ML module, for example, as generally known in the art, to match words from the qualifying event to the actions in the action repository, to identify action(s) with the highest match to the qualifying event. In some embodiments, the ACGM 128 employs one or more querying, a matching algorithm, or an AI/ML module to identify action(s) with the highest match to the qualifying event.

The method 200 proceeds to step 214, at which the method 200 presents the identified action to the agent, for the agent to present to the customer. For example, the ACGM 128 sends the identified action(s) to be displayed on the GUI 111 accessible by the agent 101. The identified action(s) are the guidance provided automatically to the agent, and augment the agent's ability to provide relevant offers to the customer, convert customer potential into actual value, among several other benefits, enhancing customer satisfaction and loyalty.

The method 200 proceeds to step 216, at which the method 200 determines whether the agent 101 offered the action to the customer 103. For example, the agent 101 interacts with the GUI 111 to input that the agent 101 presented the action to the customer 103. In some embodiments, the feedback module 132 automatically determines, based on analysis of the transcribed text 122, using NLP techniques in combination with an algorithmic module and/or an AI/ML module, whether the agent 101 presented the action to the customer 103.

The method 200 proceeds to step 218, at which the method 200 optionally receives feedback from the agent and/or the customer on the relevance of the action. For example, the feedback module 132 presents option to provide feedback corresponding to each action presented, and is configured to receive an input from the agent as to whether according to the agent, the action was relevant for the customer, or whether the customer informed the agent as to the relevance or desirability of the action, or both. In some embodiments, the feedback module 132 presents the option to provide feedback to the agent 101 only when the agent 101 offered the action to the customer 103. In some embodiments, the feedback module 132 tags the actions according to the feedback received. For example, the feedback module 132 may tag each action (e.g. in the action repository 109) as being desirable (increase customer satisfaction) or undesirable (decrease customer satisfaction), customer profile, demographics and other factors, based on the received feedback. Such tags form a part of the metadata for such actions, which enables comparison of such actions with the call context, the call metadata and/or other information including customer historical data, for example, for identification of an action according to step 212. In some embodiments, the feedback module 132 automatically determines, based on analysis of the transcribed text 122, using NLP techniques in combination with an algorithmic module and/ or an AI/ML module, the feedback of the agent 101 and/or the customer 103 with respect to the presented action.

The method 200 proceeds to step 220, at which the method 200 ends.

Figure 3:
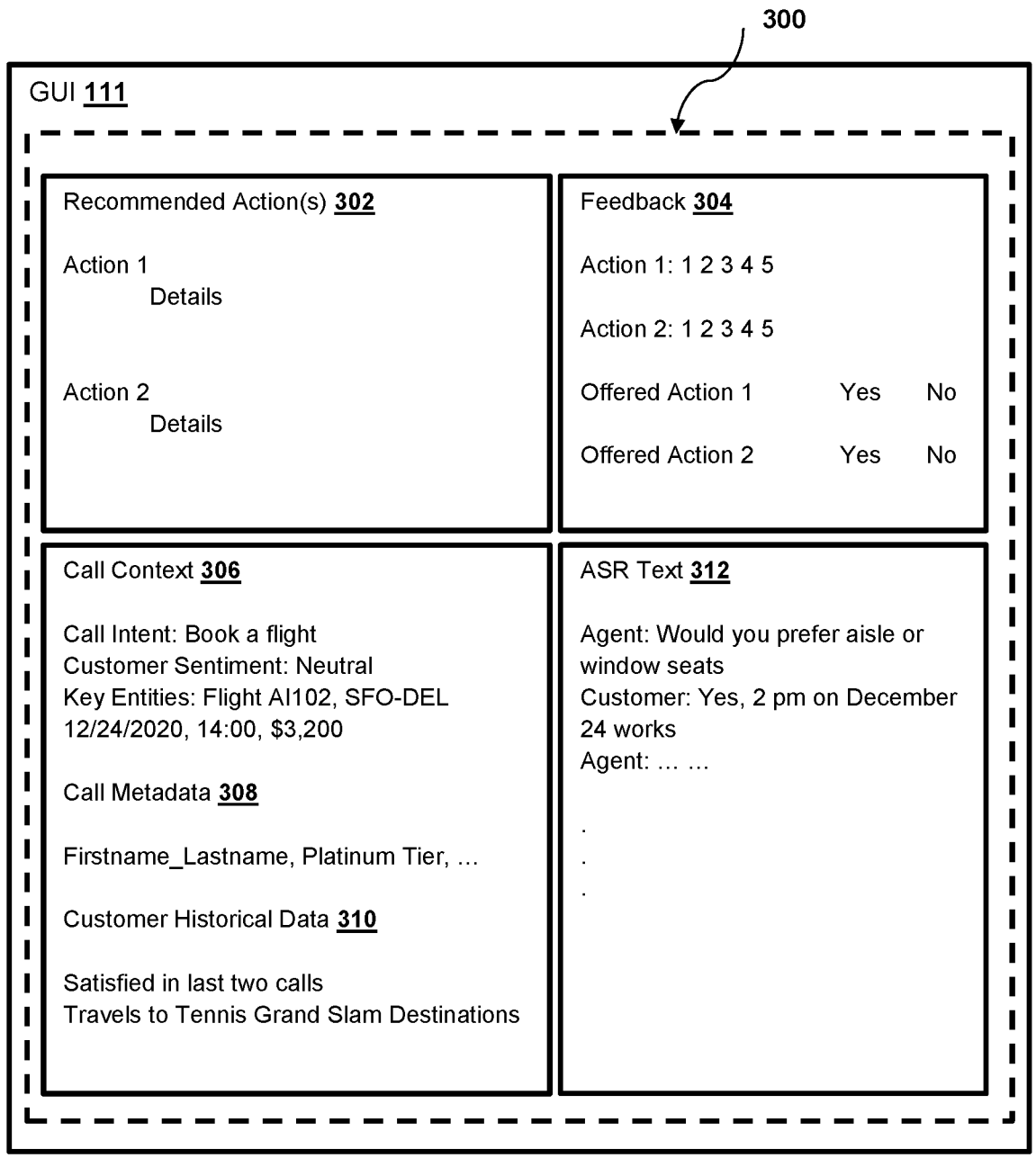
FIG. 3 is a schematic depiction of a user interface presented to an agent of FIG. 1, in accordance with an embodiment of the present invention.

FIG. 3 is a schematic depiction of an interactive screen 300 presented on the graphical user interface 111 to the agent 101 of FIG. 1, in accordance with an embodiment of the present invention. The screen 300 includes a region 302 to present one or more action(s), for example, as presented at step 214 by the ACGM 128. The screen 300 includes a region 304 to capture feedback, for example, a relevance and/or satisfaction rating of each of the action(s), whether the action(s) was offered, and the like. The screen 300 also includes a region 306 for call context, region 308 for call metadata and region 310 for customer historical data. The screen 300 also includes a region 312 displaying the transcribed text 122 as soon as the text becomes available, in a scrollable or automatic scrolling manner. The interactive screen 300 provides the agent guidance as to which action to offer to the customer for best results, and enables feedback from the agent or the customer on the guidance received, thereby enabling iterative improvement of the entire apparatus. Based on the guidance enabled by the embodiments described herein, the agent is less likely to miss opportunities to take appropriate action, for example, present a relevant offer or promotion to a customer, which can help in additional business or customer retention.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Finally, structures and functionality presented as discrete components in the example configurations may be implemented as a combined structure or component. These and other variations, modifications, additions, and improvements may fall within the scope of embodiments as described.

While the foregoing is directed to embodiments of the present invention, other and further embodiments of the invention may be devised without departing from the basic scope thereof.

We claim:

1. A method for guiding an agent during an active call between the customer and an agent, the method comprising:
    extracting, at a call analytics server (CAS), from a transcribed text of an audio of a call between a customer and an agent, a call context;
    determining, at the CAS, based on at least one of the call context, a call metadata, or a customer historical data, whether a qualifying event has occurred, wherein the call metadata is received from a call metadata source remote to the CAS, and wherein the customer historical data is extracted from a feedback module;
    upon occurrence of the qualifying event, identifying, by the CAS, an action from a plurality of actions, wherein the identifying is based on at least one of the call context, the call metadata, or the customer historical data, and wherein the plurality of actions are stored in an action repository remote to the CAS, wherein the identifying is performed using a trained artificial intelligence/machine learning (AI/ML) model, wherein the AI/ML model is trained to generate an output indicating at least one action based on an input of at least one of the call context, the call metadata, or the customer historical data; and
    sending, from the CAS to a graphical user interface (GUI) accessible by the agent, the action as guidance, while the call is active.

2. The method of claim 1, wherein the call context comprises at least one of a call intent, a customer sentiment, or a call entity.

3. The method of claim 2, wherein the extracting is performed using a trained artificial intelligence/machine learning (AI/ML) model using natural language processing (NLP) techniques.

4. The method of claim 1, further comprising:
    receiving, at the CAS from the GUI, feedback regarding the action;
    if the feedback is positive, preferring the action at a next instance of the identifying step; and
    if the feedback is negative, deferring the action at a next instance of the identifying step.

5. An apparatus for guiding an agent during an active call between the customer and an agent, the apparatus comprising:
    at least one processor;
    a memory communicably coupled to the at least one processor, the memory comprising computer executable instructions, which when executed by the at least one processor perform a method comprising:
        extracting, at a call analytics server (CAS), from a transcribed text of an audio of a call between a customer and an agent, a call context,
        determining, at the CAS, based on at least one of the call context, a call metadata, or a customer historical data, whether a qualifying event has occurred, wherein the call metadata is received from a call metadata source remote to the CAS, and wherein the customer historical data is extracted from a feedback module,
        upon occurrence of the qualifying event, identifying, by the CAS, an action from a plurality of actions, wherein the identifying is based on at least one of the call context, the call metadata, or the customer historical data, and wherein the plurality of actions are stored in an action repository remote to the CAS, wherein the identifying is performed using a trained artificial intelligence/machine learning (AI/ML) model, wherein the AI/ML model is trained to generate an output indicating at least one action based on an input of at least one of the call context, the call metadata, or the customer historical data, and sending, from the CAS to a graphical user interface (GUI) accessible by the agent, the action as guidance, while the call is active.

6. The apparatus of claim 5, wherein the call context comprises at least one of a call intent, a customer sentiment, or a call entity.

7. The apparatus of claim 6, wherein the extracting is performed using a trained artificial intelligence/machine learning (AI/ML) model using natural language processing (NLP) techniques.

8. The apparatus of claim 5, wherein the method further comprises:

receiving, at the CAS from the GUI, feedback regarding the action;

if the feedback is positive, preferring the action at a next instance of the identifying step; and if the feedback is negative, deferring the action at a next instance of the identifying step.

9. A non-transitory computer-readable medium comprising computer-executable instructions, which when executed by at least one processor perform a method for guiding an agent during an active call between the customer and an agent, the method comprising:

extracting, at a call analytics server (CAS), from a transcribed text of an audio of a call between a customer and an agent, a call context;

determining, at the CAS, based on at least one of the call context, a call metadata, or a customer historical data, whether a qualifying event has occurred, wherein the call metadata is received from a call metadata source remote to the CAS, and wherein the customer historical data is extracted from a feedback module;

upon occurrence of the qualifying event, identifying, by the CAS, an action from a plurality of actions, wherein the identifying is based on at least one of the call context, the call metadata, or the customer historical data, and wherein the plurality of actions are stored in an action repository remote to the CAS, wherein the identifying is performed using a trained artificial intelligence/machine learning (AI/ML) model, wherein the AI/ML model is trained to generate an output indicating at least one action based on an input of at least one of the call context, the call metadata, or the customer historical data; and sending, from the CAS to a graphical user interface (GUI) accessible by the agent, the action as guidance, while the call is active.

10. The computer-readable medium of claim 9, wherein the call context comprises at least one of a call intent, a customer sentiment, or a call entity.

11. The computer-readable medium of claim 10, wherein the extracting is performed using a trained artificial intelligence/machine learning (AI/ML) model using natural language processing (NLP) techniques.

12. The computer-readable medium of claim 9, further comprising:

receiving, at the CAS from the GUI, feedback regarding the action;

if the feedback is positive, preferring the action at a next instance of the identifying step; and if the feedback is negative, deferring the action at a next instance of the identifying step.

* * * * *